(12) United States Patent
Dale

(10) Patent No.: US 10,547,548 B2
(45) Date of Patent: Jan. 28, 2020

(54) EXPLODED NEXT HOP GROUPS

(71) Applicant: Arista Networks, Inc., Santa Clara, CA (US)

(72) Inventor: Lincoln Travis Dale, Mountain View, CA (US)

(73) Assignee: Arista Networks, Inc., Santa Clara, CA (US)

(*) Notice: Subject to any disclaimer, the term of this patent is extended or adjusted under 35 U.S.C. 154(b) by 0 days.

(21) Appl. No.: 16/025,600

(22) Filed: Jul. 2, 2018

(65) Prior Publication Data
US 2019/0014047 A1 Jan. 10, 2019

Related U.S. Application Data

(60) Provisional application No. 62/529,261, filed on Jul. 6, 2017.

(51) Int. Cl.
*H04L 12/745* (2013.01)
*H04L 12/24* (2006.01)

(52) U.S. Cl.
CPC ........ *H04L 45/748* (2013.01); *H04L 41/0893* (2013.01)

(58) Field of Classification Search
CPC ............... H04L 45/748; H04L 41/0893
See application file for complete search history.

(56) References Cited

U.S. PATENT DOCUMENTS

| | | | | |
|---|---|---|---|---|
| 7,246,175 | B1* | 7/2007 | Tappan | H04L 29/12358 370/392 |
| 7,359,328 | B1* | 4/2008 | Allan | H04L 43/0811 370/236.2 |
| 7,948,986 | B1* | 5/2011 | Ghosh | H04L 45/50 370/392 |
| 9,100,328 | B1* | 8/2015 | Atlas | H04L 45/28 |
| 2002/0003797 | A1* | 1/2002 | Rautenberg | H04L 45/02 370/389 |
| 2004/0223497 | A1* | 11/2004 | Sanderson | H04L 12/4641 370/395.52 |
| 2007/0030846 | A1* | 2/2007 | Szczesniak | H04L 45/02 370/389 |
| 2009/0252058 | A1* | 10/2009 | Chen | H04L 45/00 370/254 |
| 2015/0092551 | A1* | 4/2015 | Moisand | H04L 12/4633 370/235 |
| 2015/0326675 | A1* | 11/2015 | Kini | H04L 67/16 709/224 |
| 2016/0366051 | A1* | 12/2016 | Chen | H04L 45/50 |
| 2017/0346718 | A1* | 11/2017 | Psenak | H04L 45/02 |
| 2018/0091424 | A1* | 3/2018 | Jalil | H04L 45/745 |
| 2018/0351882 | A1* | 12/2018 | Jeganathan | H04L 49/70 |

* cited by examiner

*Primary Examiner* — Un C Cho
*Assistant Examiner* — Lalita W Pace
(74) *Attorney, Agent, or Firm* — Chamberlain, Hrdlicka, White, Williams & Aughtry

(57) ABSTRACT

In general, embodiments of the invention relate to a method for programming a network element to granularly track network traffic traversing through one or more network elements.

20 Claims, 10 Drawing Sheets

EXPLODED NEXT HOP GROUPS

BACKGROUND

In addressing the want for non-sampled network traffic statistics by customers, some network vendors have chosen to devote large numbers of transistors and memories on network elements towards implementing solutions for tracking non-sampled network traffic. However, this approach does not scale to accommodate higher data rates and denser network interfaces, and subsequently accrues substantial costs to the network vendors and their customers.

SUMMARY

In general, in one aspect, the invention relates to a method for programming a network element. The method comprises receiving an accounting policy configuration (APC) specifying a first network prefix and a second network prefix, and in response to receiving, and based on, the APC: storing a first forwarding equivalence class (FEC) entry in a FEC table on the network element comprising a first FEC index and bridging next hop information (BNHI), storing a first forwarding information base (FIB) entry in a FIB on the network element comprising the first network prefix and the first FEC index, storing a second FEC entry in the FEC table comprising a second FEC index and the BNHI, and storing a second FIB entry in the FIB comprising the second network prefix and the second FEC index.

In general, in one aspect, the invention relates to a network element. The network elements includes a data plane comprising a forwarding information base (FIB) and a forwarding equivalence class (FEC) table, and a control plane comprising an accounting policy service (APS) agent operatively connected to the FIB and the FEC table, and configured to: receive an accounting policy configuration (APC) specifying a first network prefix and a second network prefix, and in response to receiving, and based on, the APC: store a first FEC entry in the FEC table comprising a first FEC index and bridging next hop information (BNHI), store a first FIB entry in the FIB comprising the first network prefix and the first FEC index, store a second FEC entry in the FEC table comprising a second FEC index and the BNHI, and store a second FIB entry in the FIB comprising the second network prefix and the second FEC index.

In general, in one aspect, the invention relates to a non-transitory computer readable medium (CRM) comprising computer readable program code, which when executed by a computer processor, enables the computer processor to: receive an accounting policy configuration (APC) specifying a first network prefix and a second network prefix, and in response to receiving, and based on, the APC: store a first forwarding equivalence class (FEC) entry in a FEC table on the network element comprising a first FEC index and bridging next hop information (BNHI), store a first forwarding information base (FIB) entry in a FIB on the network element comprising the first network prefix and the first FEC index, store a second FEC entry in the FEC table comprising a second FEC index and the BNHI, and store a second FIB entry in the FIB comprising the second network prefix and the second FEC index.

Other aspects of the invention will be apparent from the following description and the appended claims.

DETAILED DESCRIPTION

Figure 1:
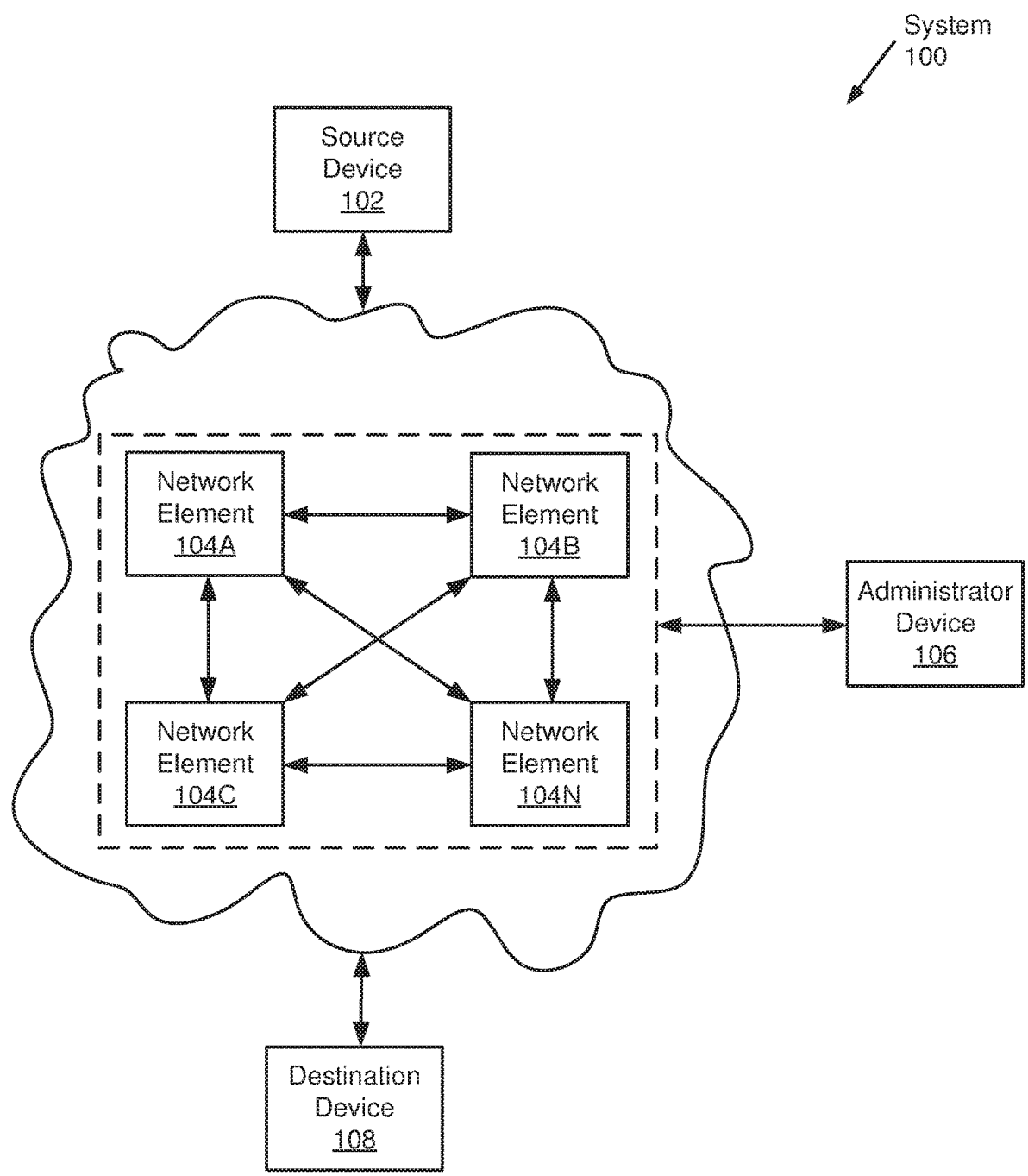
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method for programming a network element to granularly track network traffic traversing through one or more network elements. Specifically, one or more embodiments of the invention, an accounting policy configuration (APC)

obtained and implemented by the network element specifies one or more network prefixes. Each network prefix may correspond to a network destination or a sub-destination of the network destination. In one embodiment of the invention, a network destination may already be specified as a route in the routing information base (RIB) and, subsequently, the forwarding information base (FIB) on the network element. Specification of the one or more network prefixes enables the network element to segment the tracking of network traffic forwarded to a network destination reachable from the network element into subsets of the network traffic forwarded to one or more subnets (or sub-destinations) of the network destination. In performing this segmentation, the network element gains functionality to ascertain more granular accounting statistics and/or telemetry pertaining to the network traffic.

FIG. 1 shows a system in accordance with one or more embodiments of the invention. The system (100) includes a source device (102), one or more network elements (104A-104N), an administrator device (106), and a destination device (108). Each of these components is described below.

In one embodiment of the invention, the aforementioned components may be directly or indirectly connected to each other using any combination of wired and/or wireless connections. Further, the aforementioned components may communicate with each other using any combination of wired and/or wireless communication protocols.

In one embodiment of the invention, the source device (102) may be any computing system (see e.g., FIGS. 7A and 7B) that includes functionality to communicate with the destination device (108). More specifically, the source device (102) may include functionality to generate and transmit network packets addressed to the destination device (108). Examples of a source device (102) include, but are not limited to, a desktop computer, a laptop computer, a tablet computer, a server, a smartphone, a personal digital assistant (PDA), etc.

In one embodiment of the invention, a network element (104A-104N) may be a physical device that includes persistent storage, memory (e.g., random access memory (RAM)), one or more computer processors (e.g., integrated circuits) (including a switch chip or network processor (discussed below)), and two or more physical network interfaces (which may also be referred to a ports). The persistent storage in the network element (104A-104N) may include any type of non-transitory computer readable medium that includes instructions, which when executed by the one or more computer processors, enable the network element (104A-104N) to perform the functions described below in accordance with one or more embodiments of the invention (see e.g., FIGS. 4 and 5). In one embodiment of the invention, a network element (104A-104N) may include functionality to receive network packets at an ingress network interface from the source device (102) or another network element (104A-104N), and subsequently, transmit network packets to yet another network element (104A-104N) or the destination device (108). To achieve the transmission of network packets, in one embodiment of the invention, a network element (104A-104N) may determine a communication link directed to a next hop (e.g., another network element (104A-104N) or the destination device (108)) on which to forward network packets based on information included in various data structures (e.g., a forwarding information base (FIB) and a forwarding equivalence class (FEC) table) stored on the network element (104A-104N). Examples of a network element (104A-104N) include, but are not limited to, a switch, a router, and a multilayer switch. The network element (104A-104N) is discussed in further detail below with respect to FIG. 2.

In one embodiment of the invention, the administrator device (106) may be any computing system (see e.g., FIGS. 7A and 7B) that include functionality to interact with and configure a network element (104A-104N). More specifically, the administrator device (106) may include functionality to: (i) program accounting policy configurations (APCs) via an accounting policy service (APS) engine executing on a network element (104A-104N); and subsequently, either through a push or pull mechanism, (ii) receive/obtain granular accounting statistics and/or telemetry for network destinations or sub-destinations specified in the APCs (discussed below). The administrator device (106) may perform other functionalities without departing from the scope of the invention. Examples of an administrator device (106) include, but are not limited to, a desktop computer, a laptop computer, a tablet computer, or any other computing system operated by a network or datacenter administrator.

In one embodiment of the invention, the destination device (108) may be any computing system (see e.g., FIGS. 7A and 7B) that includes functionality to communicate with the source device (102). More specifically, the destination device (108) may include functionality to receive and process network packets addressed to the destination device (108). In one embodiment of the invention, the destination device (108) may include further functionality to generate and transmit network packets addressed to the source device (102) in response to receiving network packets from the source device (102). Examples of a destination device (108) include, but are not limited to, a desktop computer, a laptop computer, a tablet computer, a server, a smartphone, a personal digital assistant (PDA), etc.

While FIG. 1 shows a configuration of components, system configurations other than that shown in FIG. 1 may be used without departing from the scope of the invention. For example, multiple destination devices and/or multiple source devices may exist.

Figure 2:
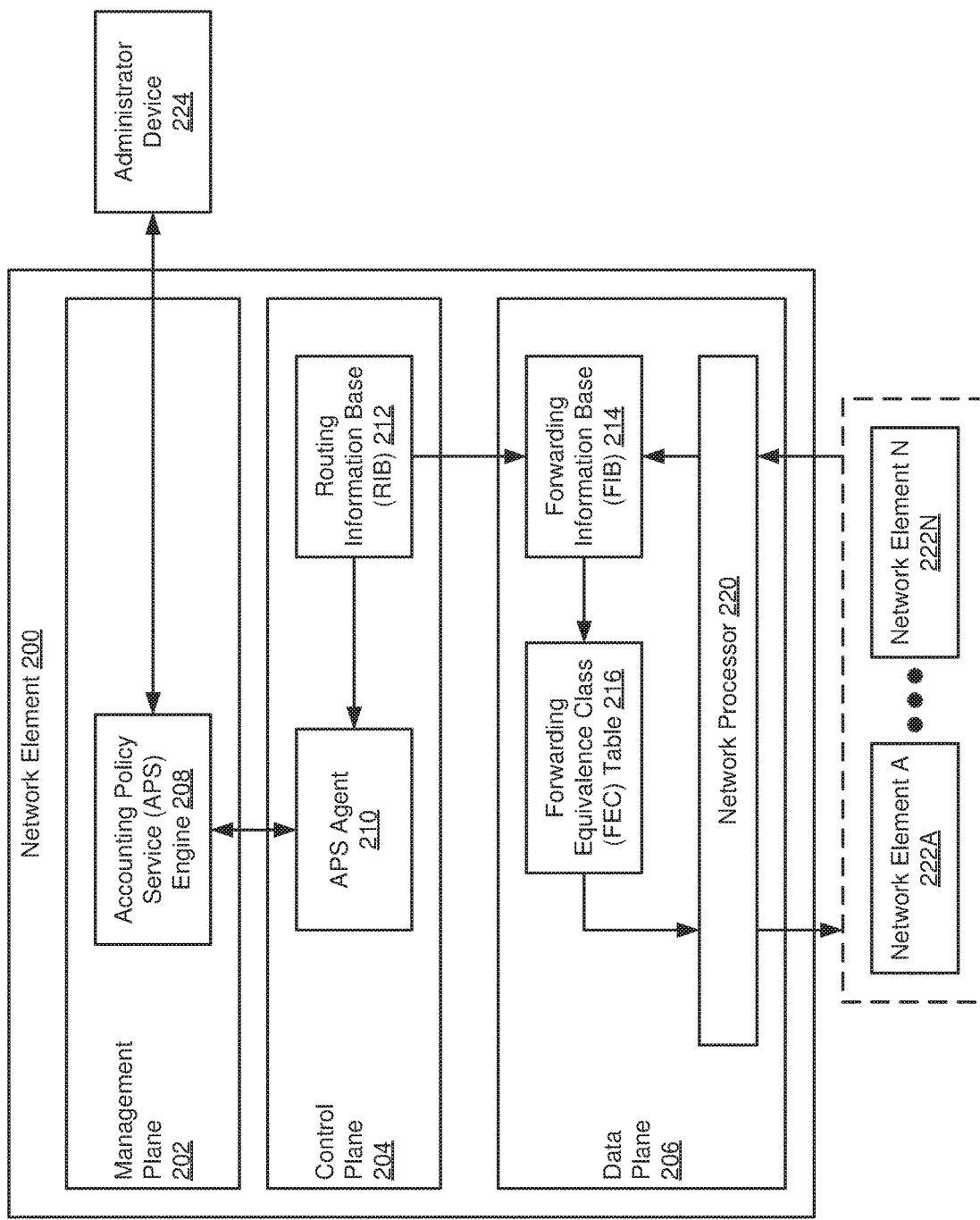
FIG. 2 shows a network element in accordance with one or more embodiments of the invention.

FIG. 2 shows a network element in accordance with one or more embodiments of the invention. The network element (200) includes a management plane (202), a control plane (204), a data plane (206), and one or more ports to send and/or receive packets. Each of these components is described below.

In one embodiment of the invention, the management plane (202) may be a first portion of the architecture employed in the network element (200). The management plane (202) may be implemented using hardware, software, firmware, and/or any combination thereof. In one embodiment of the invention, the management plane (202) includes functionality to configure the network element (200). The management plane (202) may include an accounting policy service (APS) engine (208). This component is described below.

In one embodiment of the invention, the APS engine (208) may be software instructions corresponding to computer readable program code executing on the one or more processors of the network element (200). Further, when executed, the software instructions may enable the APS engine (208) to: (i) obtain accounting policy configurations (APCs) (discussed below) from an administrator device; (ii) push obtained APCs to the APS agent (210) executing on the control plane (204) for processing; and (iii) provide, via a graphical user interface (GUI) or a command line interface (CLI) displayed on the administrator device, tools for: (a) facilitating the generation and/or adjustment of APCs by an operator of the administrator device, and (b) presenting the granular accounting statistics and/or telemetry resulting from the implementation of APCs on the network element (200).

In one embodiment of the invention, the control plane (204) may be a second portion of the architecture employed in the network element (200). The control plane (204) may be implemented using hardware, software, firmware, and/or any combination thereof. In one embodiment of the invention, the control plane (204) includes functionality to manage the overall operation of the data plane (206) (including the programming of the forwarding information base (FIB) (214) and the forwarding equivalence class (FEC) table (216)). The control plane (204) includes an APS agent (210) and a routing information base (RIB) (212). Each of these components is described below.

In one embodiment of the invention, the APS agent (210) may be a process executing on the one or more computer processors of the network element (200). The APS agent (210) may include functionality to: (i) receive accounting policy configurations (APCs) from the APS engine (208); (ii) obtain, from the RIB (212), routes associated with network destinations specified in the APCs; (iii) program the FIB (214) and the FEC table (216) towards implementing received APCs; (iv) aggregate accounting statistics and/or telemetry based on the received APCs; and (v) provide the aggregated information of (iv) back to the APS engine (208) in response to a pulling or pushing mechanism from/to the administrator device (224).

In one embodiment of the invention, the RIB (212) may be a data repository for storing and tracking routes to network destinations reachable from the network element (200). As a data repository, the RIB (212) may take the form of any type of storage unit and/or device such as, for example, a file system, a database, a collection of tables, or any other storage medium. Further, the RIB (212) may include multiple different storage units and/or devices. In one embodiment of the invention, the RIB (212) may include information pertaining to the topology of the network immediately around the network element (200). The RIB (212) may be programmed through the selection of best paths or routes for network packets by one or more routing protocols (e.g., border gateway protocol (BGP), open shortest path first (OSPF), etc.) executing/employed on the network element (200). Additional details about the RIB (212) are described below with respect to FIG. 3A.

In one embodiment of the invention, the data plane (206) may be a third portion of the architecture employed in the network element (200). The data plane (206) may be implemented using hardware, software, firmware, and/or any combination thereof. In one embodiment of the invention, the data plane (206) may include functionality to receive network packets via ingress network interfaces (not shown), process the network packets, and, as appropriate, transmit network packets via egress network interfaces towards a destination. As mentioned above, network packets may be received from a source device or another network element (222A-222N), whereas network packets may be transmitted to another network element (222A-222N) or a destination device. In one embodiment of the invention, network packets may be further received and/or transmitted from/to an administrator device (224). Towards achieving the aforementioned functionalities, the data plane (206) includes a FIB (214), a FEC table (216) and a network processor (220). Each of these components is described below.

In one embodiment of the invention, the FIB (214) may be a data repository for storing and mapping routes to FEC indices. As a data repository, the FIB (214) may take the form of any type of storage unit and/or device such as, for example, a file system, a database, a collection of tables, or any other storage medium. Further, the FIB (214) may include multiple different storage units and/or devices. In one embodiment of the invention, the FIB (214) may be programmed by one or more processes (including the APS agent (210)) that may be executing on the network element (200). In one embodiment of the invention, the FIB (214) may be programmed based on route entries stored in the RIB (212). Additional details about the FIB (214) are described below with respect to FIG. 3B.

In one embodiment of the invention, the FEC table (216) may be a data repository for storing and mapping FEC indices to next hops. Particularly, the FEC indices are mapped to forwarding information pertaining to next hops along routes to network destinations reachable from the network element (200). As a data repository, the FEC table (216) may take the form of any type of storage unit and/or device such as, for example, a file system, a database, a collection of tables, or any other storage medium. Further, the FEC table (216) may include multiple different storage units and/or devices. In one embodiment of the invention, the FEC table (216) may be programmed by one or more processes (including the APS agent (210)) that may be executing on the network element (200). Additional details about the FEC table (216) are described below with respect to FIG. 3C.

In one embodiment of the invention, the network processor (220) may be hardware that determines which egress network interface on the network element (200) to forward media access control (MAC) frames. The network processor (220) may include egress and ingress interfaces that may connect to network interfaces on the network element (200). Each network interface (not shown) may be connected to another network element (222A-222N), a source device, an administrator device, or a destination device. The network processor (220) may be configured to receive network packets via one or more ingress network interfaces and determine whether to (i) drop the network packets, (ii) process the network packets in accordance with one or more embodiments of the invention, and/or (iii) send the network packets, based on the processing, out one or more egress network interfaces on the network element (200).

In one embodiment of the invention, how the network processor (220) makes the determination of whether to drop a network packet, and/or send a network packet to another network element (222A-222N) or device depends, in part, on whether the network element (200) is a layer-2 (L2) switch or a layer-3 (L3) switch (also referred to as a multilayer switch), which may perform at least some functions of a router. If the network element (200) is operating as a L2 switch, the network processor (220) uses the destination MAC address included in the network packet, along with the FIB (214) and the FEC table (216), to determine out of which network interface to send the network packet. If the network element (200) is operating as a L3 switch, the network processor (220) uses the destination Internet Protocol (IP) address included in the network packet, along with the RIB (212), to determine out of which network interface to send the network packet. Further, the network processor (220) includes the ability to write the MAC address of the next hop (e.g., another network element (222A-222N) or device) to receive the network packet in place of its own MAC address (which the last network element (222A-222N) or device to send the network packet wrote) in the L2 information encapsulating the network packet. If the network element (200) is a multilayer switch, the network processor (220) includes functionality to process network packets using both MAC addresses and IP addresses. Examples of a network processor (220) include, but are not limited to, a field programmable gate array (FPGA), an application specific integrated circuit (ASIC), a digital signal processor (DSP), a microcontroller, a discrete processor, etc.

Figure 3A:
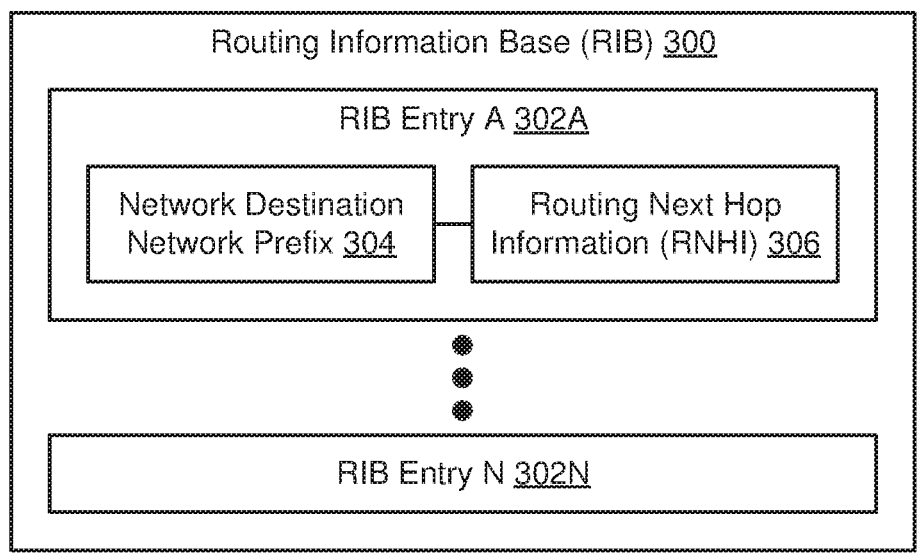
FIG. 3A shows a routing information base in accordance with one or more embodiments of the invention.

FIG. 3A shows a routing information base (RIB) in accordance with one or more embodiments of the invention. The RIB (300) may include one or more RIB entries (302A-302N). Each RIB entry (302A-302N) may correspond to a route to a particular network destination. Further, each RIB entry (302A-302N) includes a network destination network prefix (304) and corresponding routing next hop information (RNHI) (306). In one embodiment of the invention, the network destination network prefix (304) may be a network prefix to a network destination reachable from the network element on which the RIB (300) resides. In one embodiment of the invention, a network destination may be a set (e.g., one or more) of computing systems (e.g., a private network, a subnet, a datacenter, etc.) that may be operatively connected (e.g., directly or indirectly connected) to the network element through a local area network (LAN) or a wide area network (WAN) such as the Internet. Subsequently, the network destination network prefix (304) may identify the set of computing systems within a LAN, WAN, or any other type of network. In one embodiment of the invention, RNHI (306) may include routing information pertaining to a next hop (e.g., another network element or device connected to the network element on which the RIB (300) resides) along a path to a network destination. The routing information encompassed in the RNHI (306) may include, but is not limited to, an Internet Protocol (IP) address associated with the next hop, a cost or metric for using the path or route associated with the RIB entry (302A-302N), quality of service (QoS) indicators characterizing a current performance of the path or route, etc.

Figure 3B:
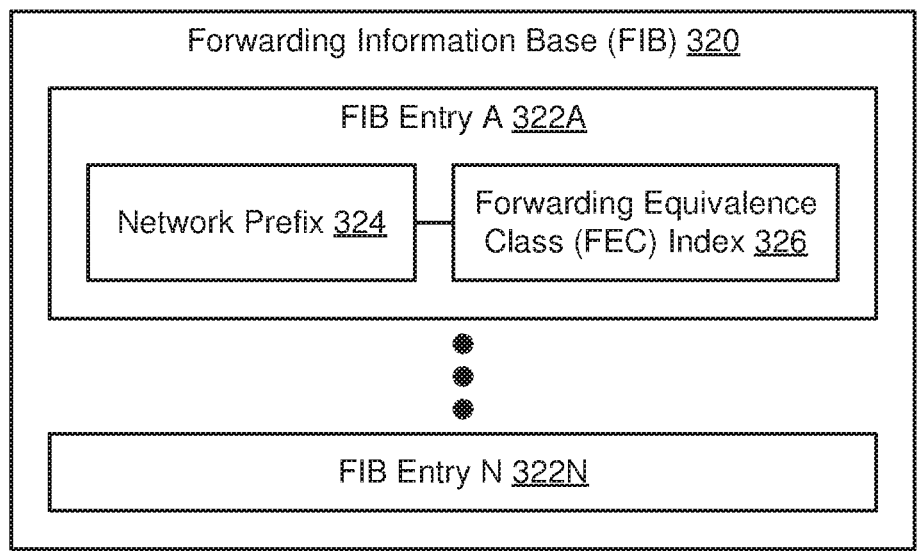
FIG. 3B shows a forwarding information base in accordance with one or more embodiments of the invention.

FIG. 3B shows a forwarding information base (FIB) in accordance with one or more embodiments of the invention. The FIB (320) may include one or more FIB entries (322A-322N). In one embodiment of the invention, one or more FIB entries (322A-322N) may correspond to a single route or RIB entry (302A-302N) in the RIB (300). Further, each FIB entry (322A-322N) includes a network prefix (324) and a corresponding forwarding equivalence class (FEC) index (326). In one embodiment of the invention, the network prefix (324) may correspond to a network destination (discussed above). In another embodiment of the invention, the network prefix (324) may correspond to a sub-destination. In one embodiment of the invention, a sub-destination may be a subset of the set of computing systems that form a network destination.

By way of an example, a network destination may be the set of computing systems that form the Massachusetts Institute of Technology (MIT) network. Further to this example, a first sub-destination may refer to the subset of computing systems of the MIT network, which correspond to the School of Engineering. A second sub-destination may refer to the subset of computing systems of the MIT network, which correspond to the Admissions Department, and so on. As such, in one embodiment of the invention, a sub-destination may be a particular portion of a network destination to which subsets of all network traffic to the network destination are addressed and forwarded.

Figure 3C:
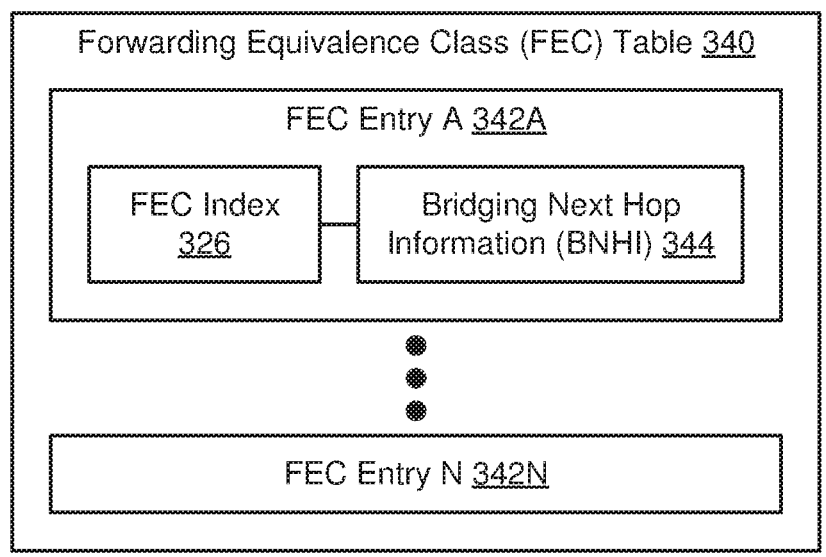
FIG. 3C shows a forwarding equivalence class table in accordance with one or more embodiments of the invention.

In one embodiment of the invention, the FEC index (326) may be an identifier referencing a FEC entry (342A-342N) in the FEC table (340) (see e.g., FIG. 3C). In such an embodiment, the identifier may be a string of characters (e.g., letters, numbers, symbols, etc.) of any predefined length that is used to uniquely identify the FEC entry (342A-342N). In another embodiment of the invention, the FEC index (326) may be an address in memory associated with the FEC entry (342A-342N).

FIG. 3C shows a forwarding equivalence class (FEC) table in accordance with one or more embodiments of the invention. The FEC table (340) may include one or more FEC entries (342A-342N). In one embodiment of the invention, each FEC entry (342A-342N) includes a FEC index (326) and bridging next hop information (BNHI) (344). As discussed above, the FEC index (326) may be a unique identifier referencing or an address in memory associated with the FEC entry (342A-342N) within which the FEC index (326) resides. In one embodiment of the invention, BNHI (344) may include bridging or forwarding information pertaining to a next hop along a path to a network destination. In one embodiment of the invention, the BNHI (344) corresponds to the RNHI (306) specified in a RIB entry (302A-302N) in the RIB (300) (see e.g., FIG. 3A). The BNHI (344) may be bridging information obtained from performing a next hop resolution on a corresponding RNHI (306). Next hop resolutions are often performed when programming the FIB (320) (see e.g., FIG. 3B) based on routes populated in the RIB (300).

In one embodiment of the invention, the bridging or forwarding information encompassed in the BNHI (344) may include, but is not limited to, the media access control (MAC) address associated with the next hop and an identifier associated with an egress network interface on the network element that connects to the next hop. The identifier associated with the egress network interface may be a string of characters (e.g., letters, numbers, symbols, etc.) of any predefined length that is used to uniquely identify the egress network interface. In one embodiment of the invention, the BNHI (344) may also include a multiprotocol label switching (MPLS) push operation, thereby allowing network packets to be forwarded utilizing labels. In yet another embodiment of the invention, the BNHI (344) may include an identifier referencing a generic routing encapsulation (GRE) tunnel through which network packets traverse towards a network destination or sub-destination. The BNHI (344) may include additional or alternative bridging or forwarding information without departing from the scope of the invention.

In one embodiment of the invention, one or more FEC entries (342A-342N) in the FEC table (340) may include the same BNHI (344), which may correspond to RNHI (306) associated with a particular route (e.g., RIB entry (302A-302N)). That is, a particular route to a network destination (e.g., a specified network destination network prefix (304)) may map to one or more corresponding FIB entries (322A-322N), which are programmed into the FIB (320) based on the accounting policy configuration (APC) (discussed below) specified for the particular route or network destination. In one embodiment of the invention, each of the aforementioned one or more FIB entries (322A-322N) may correspond to a sub-destination (e.g., a specified sub-destination network prefix (324)). Following embodiments of the invention discussed above, the one or more FIB entries (322A-322N) corresponding to the network destination and/or sub-destinations pertaining to a particular route are then associated with one or more corresponding FEC entries (342A-342N).

In one embodiment of the invention, one or more FEC entries (342A-342N) in the FEC table (340) may be mapped to a hardware and/or software counter (not shown). The counter may include functionality to track (i) the number of network packets and/or (ii) the number of bytes that are forwarded to a next hop along the path to a network destination or sub-destination corresponding to the FEC entry (342A-342N) associated with the counter. In one embodiment of the invention, the aforementioned tracked information may be aggregated by the accounting policy service (APS) agent executing on the network element in order to generate accounting statistics and/or telemetry for network traffic traversing the network element. Tracked information in each counter may subsequently produce accounting statistics and/or telemetry for network traffic directed to a network destination or a sub-destination of the network destination. In one embodiment of the invention, the accounting statistics and/or telemetry may relate to, for example, totals of network traffic, percentages of network traffic, ratios of network traffic, proportions of network traffic, or any other statistical quantity, or any combination thereof.

Figure 4:
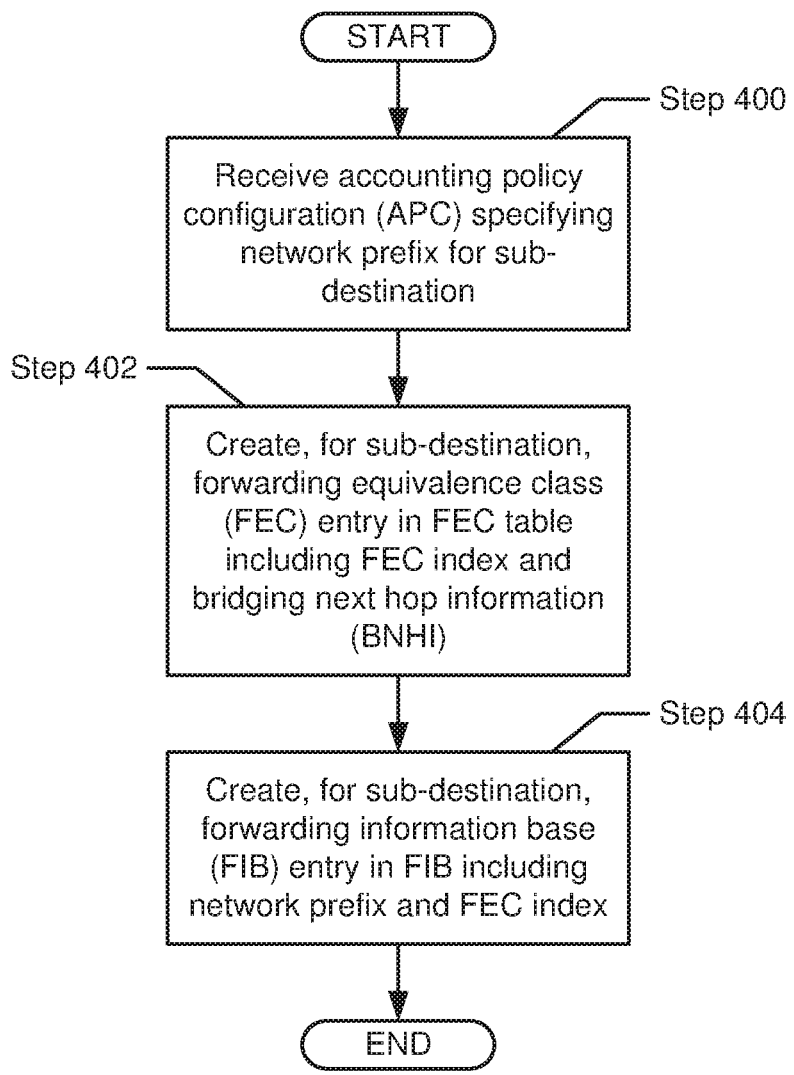
FIG. 4 shows a flowchart describing a method for implementing an account policy configuration in accordance with one or more embodiments of the invention.
Figure 5:
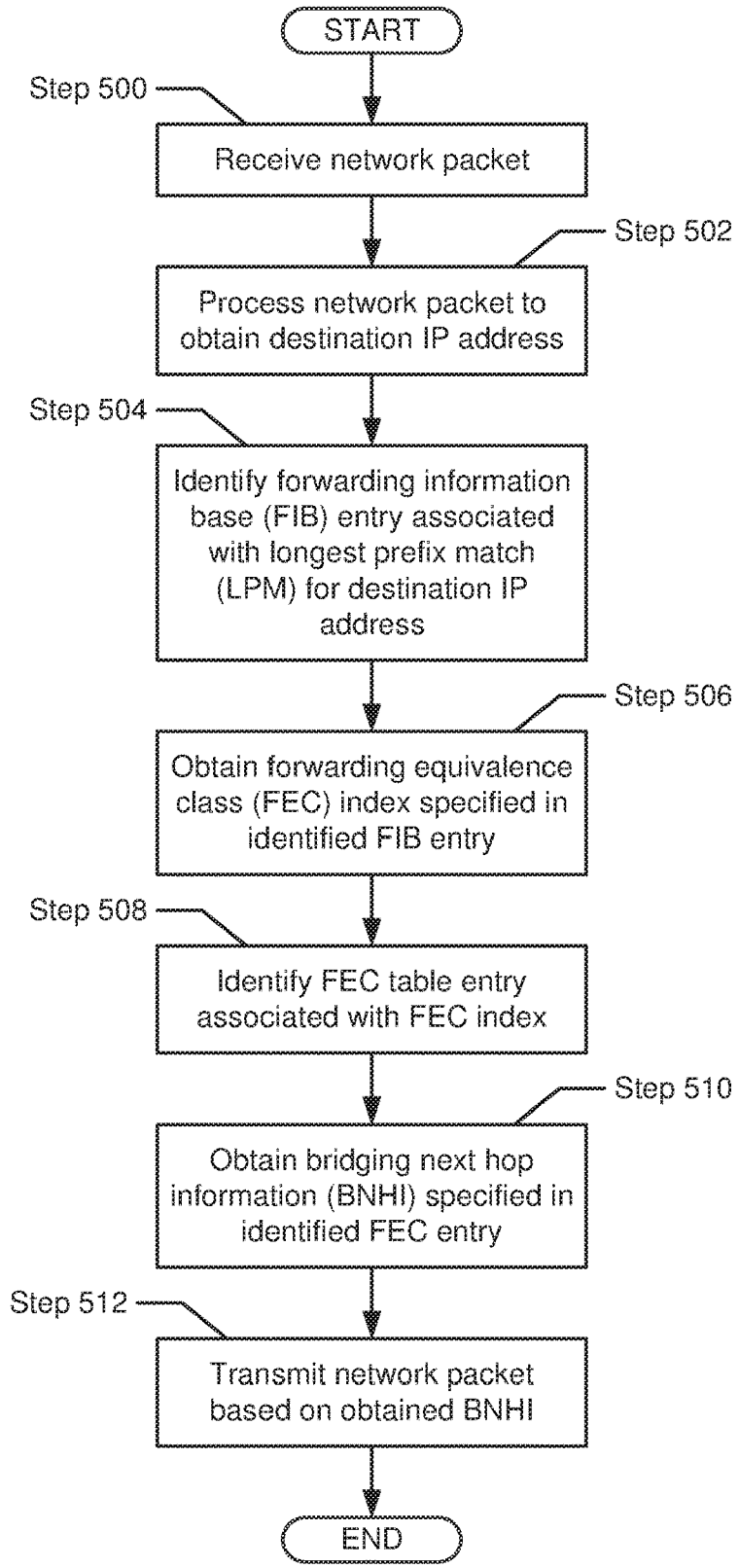
FIG. 5 shows a flowchart describing a method for processing a network packet in accordance with one or more embodiments of the invention.

FIGS. 4 and 5 show flowcharts in accordance with one or more embodiments of the invention. While the various steps in the flowcharts are presented and described sequentially, one of ordinary skill will appreciate that some or all of the steps may be executed in different orders, may be combined or omitted, and some or all steps may be executed in parallel. In one embodiment of the invention, the steps shown in FIGS. 4 and 5 may be performed in parallel with any other steps shown in FIGS. 4 and 5 without departing from the scope of the invention.

FIG. 4 shows a flowchart describing a method for implementing an accounting policy configuration in accordance with one or more embodiments of the invention. In Step 400, an accounting policy configuration (APC) is received. Further, the APC may be submitted by an operator of an administrator device via the accounting policy service (APS) engine executing on the management plane of the network element (see e.g., FIG. 2). In one embodiment of the invention, the APC may include computer readable program code, which when executed by the one or more processors of the network element, programs the network element to execute embodiments of the invention. More specifically, the APC may configure the network element to update the FIB and the FEC table in order to capture granular accounting statistics and/or telemetry for network traffic traversing the network element. In one embodiment of the invention, the APC may specify one or more network prefixes. Each of the network prefixes may correspond to a network destination or a sub-destination of the network destination.

In one embodiment of the invention, a network destination may be a set of computing systems (e.g., a private network, a subnet, a datacenter, etc.) that may be operatively connected (e.g., directly or indirectly) to the network element through a local area network (LAN), a wide area network (WAN), such as the Internet, or any other type of network. The network destination may be associated with an existing route (or RIB entry in the RIB). In one embodiment of the invention, a sub-destination may be a subset of the set of computing systems forming the network destination. The subset may include at least one computing system of the aforementioned set of computing systems.

Referring to the MIT example mentioned above, conventionally, when received by the network element, network traffic would be processed in conjunction with the FIB on the network element and forwarded through an appropriate egress network interface on the network element to a connected next hop. Prior to the invention, all network traffic, whether addressed specifically to a subnet for the School of Engineering or another subnet for the Admissions Department, would be processed and logged under the network prefix for the MIT network. In implementing an APC, however, the FIB on the network element may be updated to segment the network prefix for the MIT network (e.g., a network destination network prefix) into a set of network prefixes (specified in the APC) directed to the School of Engineering, the Admissions Department, and other subnets in the MIT network (e.g., one or more sub-destination network prefixes). Subsequently, when network traffic for the MIT network is received and processed, subsets of the network traffic forwarded to a common next hop in the path towards each of those subnets (or sub-destinations) are tracked and/or accounted. In one embodiment of the invention, granular accounting of network traffic on a per path, per network prefix, and other factors may be tracked and captured via implementation of any given APC.

In Step 402, based on the APC (received in Step 400), a forwarding equivalence class (FEC) entry is created in the FEC table for each network prefix specified in the APC. In one embodiment of the invention, each respective FEC entry may include a FEC index, and bridging next hop information (BNHI). In one embodiment of the invention, the FEC index (as discussed above) may be an identifier referencing the FEC entry in the FEC table (see e.g., FIG. 3C). In such an embodiment, the identifier may be a string of characters (e.g., letters, numbers, symbols, etc.) of any predefined length that is used to uniquely identify the FEC entry. In another embodiment of the invention, the FEC index may be an address in memory associated with the FEC entry. In one embodiment of the invention, the FEC index may be generated upon instantiation (or creation) of the FEC entry.

In one embodiment of the invention, BNHI may include bridging or forwarding information pertaining to a next hop along a path to a network destination (or sub-destination). In one embodiment of the invention, the BNHI may correspond to the routing next hop information (RNHI) specified in a RIB entry in the RIB (see e.g., FIG. 3A). The BNHI may be bridging information obtained from performing a next hop resolution on a corresponding RNHI. Next hop resolutions are often performed when programming the FIB (see e.g., FIG. 3B) based on routes populated in the RIB.

In one embodiment of the invention, the bridging or forwarding information encompassed in the BNHI may include, but is not limited to, the media access control (MAC) address associated with the next hop and an identifier associated with an egress network interface on the network element that connects to the next hop. The identifier associated with the egress network interface may be a string of characters (e.g., letters, numbers, symbols, etc.) of any predefined length that is used to uniquely identify the egress network interface. In one embodiment of the invention, the BNHI may also include a multiprotocol label switching (MPLS) push operation, thereby allowing network packets to be forwarded utilizing labels. In yet another embodiment of the invention, the BNHI may include an identifier referencing a generic routing encapsulation (GRE) tunnel through which network packets traverse towards a network destination or sub-destination. The BNHI may include additional or alternative bridging or forwarding information without departing from the scope of the invention.

In Step 404, after creating a FEC entry for each network prefix specified in the APC, a corresponding forwarding information base (FIB) entry is created in the FIB for each network prefix. In one embodiment of the invention, each FIB entry may include a network prefix (specified in the APC) and the FEC index (created in Step 402) for the network prefix. Thus, effectively, a FIB entry in the FIB (or more specifically, a network prefix) may map to a FEC entry in the FEC table.

FIG. 5 shows a flowchart describing a method for processing a network packet in accordance with one or more embodiments of the invention. In Step 500, a network packet is received. In one embodiment of the invention, the network packet may arrive at an ingress network interface on the network element from another network element or a device. In one embodiment of the invention, the network element and the other aforementioned network element may be next hops in the path or route to a network destination (or sub-destination) to which the network packet is addressed. In other words, the other network element may have processed the network packet, upon receiving the network packet, in a similar manner as the steps outlined in FIG. 5, before ultimately forwarding the network packet to the current network element.

In Step 502, the network packet received in Step 500 is processed to obtain a destination IP address. In one embodiment of the invention, processing the network packet may involve examining the header information of the network packet to identify and obtain the destination IP address. The destination IP address may be associated with a particular computing system (e.g., a destination device) for which the network packet is intended.

In Step 504, using the obtained destination IP address, a FIB entry in the FIB is identified. In one embodiment of the invention, the FIB entry may be identified by performing a longest prefix match (LPM) for the obtained destination IP address using the network prefixes specified in the existing FIB entries. In Step 506, the FEC index specified in the FIB entry identified in Step 504 is obtained. In Step 508, the FEC entry in the FEC table associated with the FEC index obtained in Step 506 is identified. In one embodiment of the invention, the FEC entry may be identified by comparing and matching the obtained FEC index with one of the FEC indices included in existing FEC entries in the FEC table. In another embodiment of the invention, the FEC entry may be identified by looking in the memory address within associated memory of the network element to which the obtained FEC index references.

In Step 510, the BNHI specified in the FEC entry identified in Step 508 is obtained. Afterwards, in Step 512, at least a portion of the header information of the network packet is modified to include at least a portion (e.g., next hop MAC address) of the obtained BNHI. In one embodiment of the invention, a remainder of the obtained BNHI (e.g., an identifier for an egress network interface on the network element, an MPLS push operation, a GRE tunnel identifier, etc.) may be used to forward the data packet towards its network destination or sub-destination via the next hop associated with the obtained BNHI.

In one embodiment of the invention, further to forwarding the network packet, the counter mapped or attached to the identified FEC entry in the FEC table may be incremented. As mentioned above, the counter may track (i) the number of network packets, and/or (ii) the number of bytes forwarded towards the network destination or sub-destination corresponding to the identified FEC entry. Accordingly, in one embodiment of the invention, the counter may be incremented by one if the tracking is based on network packets. In another embodiment of the invention, the counter may be incremented by the number of bytes representing the payload of the network packet if the tracking is based on bytes. Further, with this tracking of network packets and/or bytes by each counter associated with each FEC entry, more refined or granular accounting statistics and/or telemetry may be aggregated.

Figure 6A:
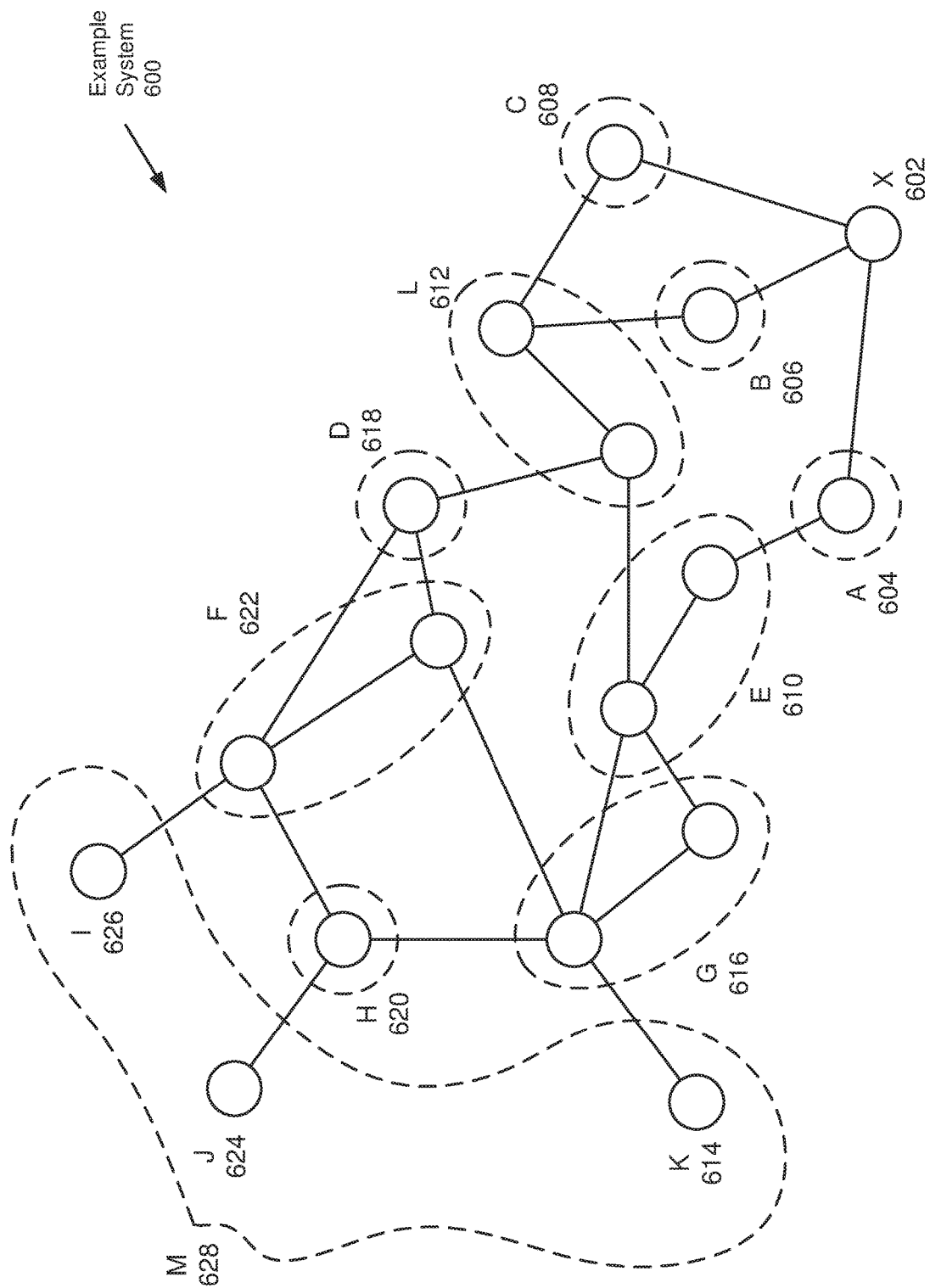
FIG. 6A shows an example system in accordance with one or more embodiments of the invention.
Figure 6B:
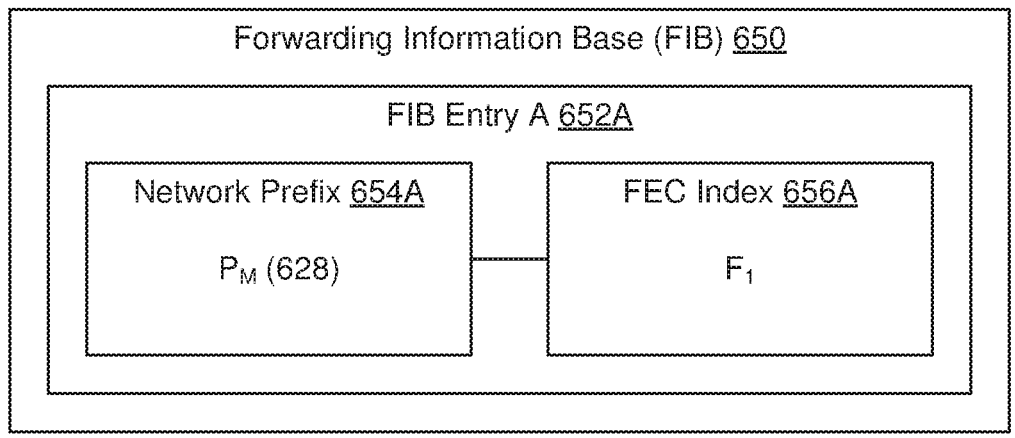
FIGS. 6B and 6C show example forwarding information bases and forwarding equivalence class tables in accordance with one or more embodiments of the invention.
Figure 6B:
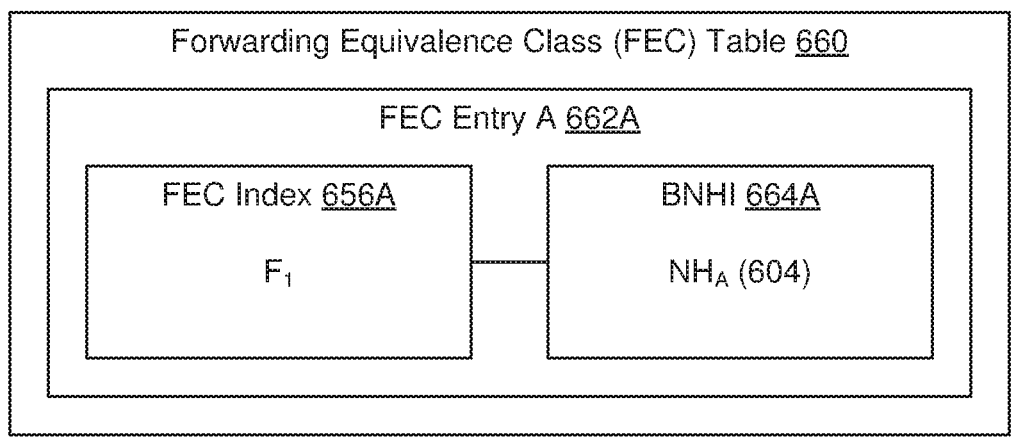
Figure 6C:
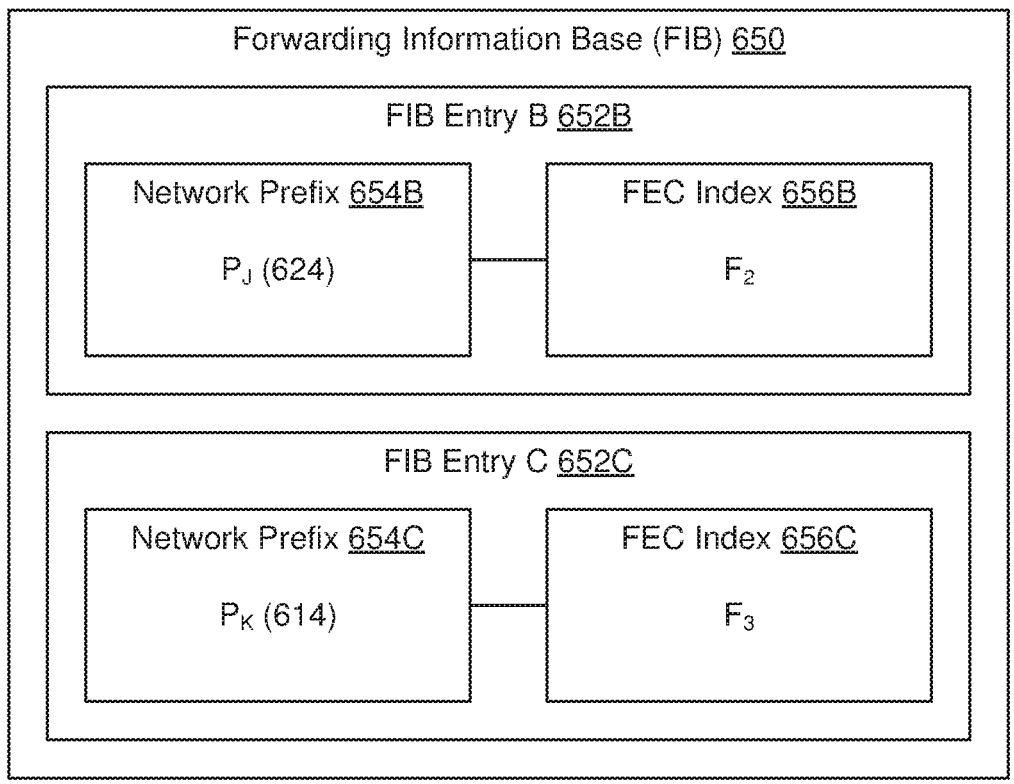
Figure 6C:
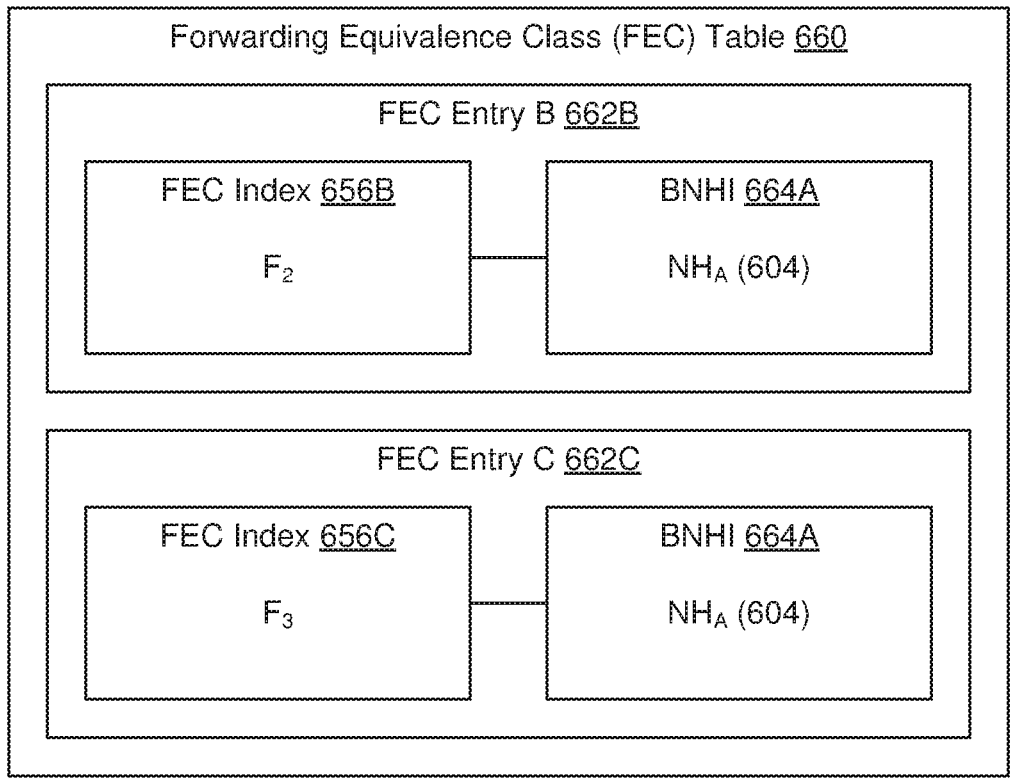

FIGS. 6A-6C show various aspects of an example in accordance with one or more embodiments of the invention. The following example is for explanatory purposes only and not intended to limit the scope of the invention.

Turning to FIG. 6A, FIG. 6A shows an example system in accordance with one or more embodiments of the invention. The example system (600) includes an edge network element X (602) that is operatively connected to a network destination M (628). Though not shown, the edge network element X (602) may, in one embodiment of the invention, be directly connected to a source device from which network packets forwarded to the network destination (628) may originate. The network destination (628) includes three sub-destinations designated as nodes K (614), J (624), and I (626). The remaining nodes presented in the example system (600) are segmented into next hops (e.g., next hops A (604), B (606), C (608), E (610), L (612), G (616), D (618), H (620), and F (622)), which operatively connect the edge network element X (602) to the network destination (628). For purposes of this example, assume that a network packet destined for any of sub-destinations K (614), J (624), or I (626) (collectively network destination M (628)) map to the same prefix ($P_M$) (FIG. 6B, 650).

FIG. 6B shows an example FIB and FEC table in accordance with one or more embodiments of the invention. More specifically, FIG. 6B illustrates the state of a FIB (650) and FEC table (660) prior to the implementation of embodiments of the invention. In this initial state, the FIB (650) may include a first FIB entry (652A) storing a mapping of a network prefix $P_M$ (654A) associated with the network destination M (628) to a FEC index $F_1$ (656A). Further to this initial state, the FEC table (660) may include a first FEC entry (662) storing a mapping of the FEC index $F_1$ to bridging next hop information (BNHI) $NH_A$ (664A) associated with next hop A (604). Based on this initial state of the FIB (650) and the FEC table (660), when a network packet is received at edge network element X (602) that is addressed to sub-destinations K (614), J (624), or I (626) (collectively network destination M (628)), the network packet is rewritten to include BNHI $NH_A$ (664A) for next hop A (604) and forwarded along a path (starting at next hop A (604)) towards the relevant sub-destination (614, 624, or 626). A first counter (not shown) respective to the FEC entry (662A) is subsequently incremented. In incrementing the first counter, the edge network element X (602) records that another network packet has been transmitted towards network destination M (628). Statistics that may be generated based on this granularity of recordation may include, for example, a total number of network packets forwarded to sub-destinations K (614), J (624), and I (626), collectively. However, there is no specific information on which network packets were destined for the individual sub-destinations.

FIG. 6C shows an example FIB and FEC table in accordance with one or more embodiments of the invention. More specifically, FIG. 6C illustrates the state of the FIB (650) and the FEC table (660) after the implementation of embodiments of the invention. In this new state, the FIB (650) may be updated to further (or alternatively) include a second FIB entry (652B) and a third FIB entry (652C). The second FIB entry (652B) may store a mapping of a network prefix $P_J$ (654B) associated with sub-destination J (624) to a FEC index $F_2$ (656B). The third FIB entry (652B) may store a mapping of a network prefix $P_K$ (654C) associated with sub-destination K (614) to a FEC index $F_3$. Further to this new state, the FEC table (660) may be updated to further (or alternatively) include a second FEC entry (662B) and a third FEC entry (662C). The second FEC entry (662B) may store a mapping of FEC index $F_2$ to BNHI $NH_A$ (664A) associated with next hop A (604). The third FEC entry (662C) may store a mapping of FEC index $F_3$ (656C) to BNHI $NH_A$ (664A) associated with next hop A (604).

In one embodiment of the invention, based on this new state of the FIB (650) and the FEC table (660), when a network packet is received at edge network element X (602) that is addressed to sub-destination J (624), the network packet is rewritten to include BNHI $NH_A$ (664A) for next hop A (604) and forwarded along a path (starting at next hop A (604)) towards sub-destination J (624). A second counter (not shown) respective to the second FEC entry (662B) is subsequently incremented. In incrementing the second counter, the edge network element X (602) records that another network packet has been transmitted towards network destination M (628), and specifically, towards sub-destination J (624). Statistics that may be generated based on this granularity of recordation may include, for example, a total number of network packets forwarded specifically to sub-destination J (624) and a percentage of the total number of network packets forwarded to network destination M (628) that was destined to sub-destination J (624).

In one embodiment of the invention, based on this new state of the FIB (650) and the FEC table (660), when a network packet is received at edge network element X (602) that is addressed to sub-destination K (614), the network packet is rewritten to include BNHI $NH_A$ (664A) for next hop A (604) and forwarded along a path (starting at next hop A (604)) towards sub-destination K (614). A third counter (not shown) respective the third FEC entry (662C) is subsequently incremented. In incrementing the third counter, the edge network element X (602) records that another network packet has been transmitted towards network destination M (628), and specifically, towards sub-destination K (614). Statistics that may be generated based on this granularity of recordation may include, for example, a total number of network packets forwarded specifically to sub-destination K (614) and a percentage of the total number of network packets forwarded to network destination M (628) that was destined to sub-destination K (614).

Figure 7A:
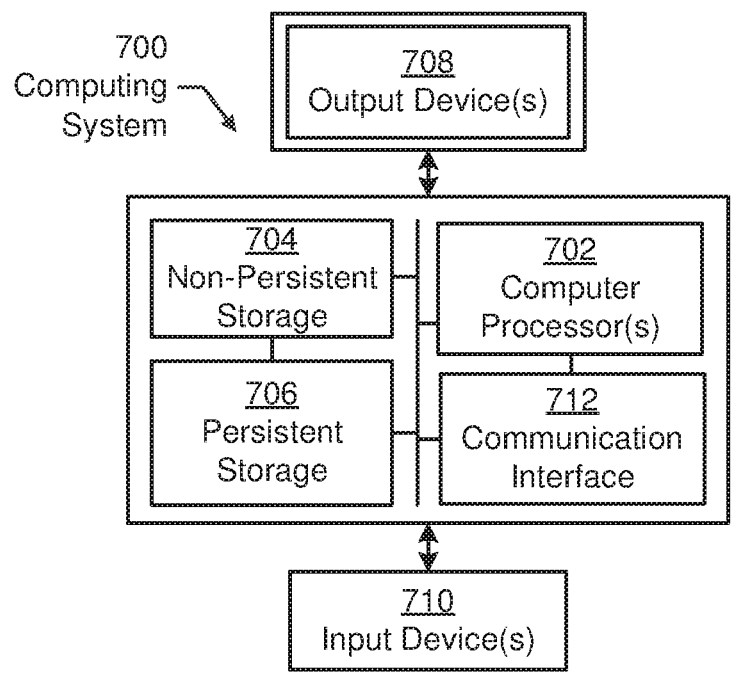
FIGS. 7A and 7B show computing systems in accordance with one or more embodiments of the invention.

Embodiments of the invention may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 7B:
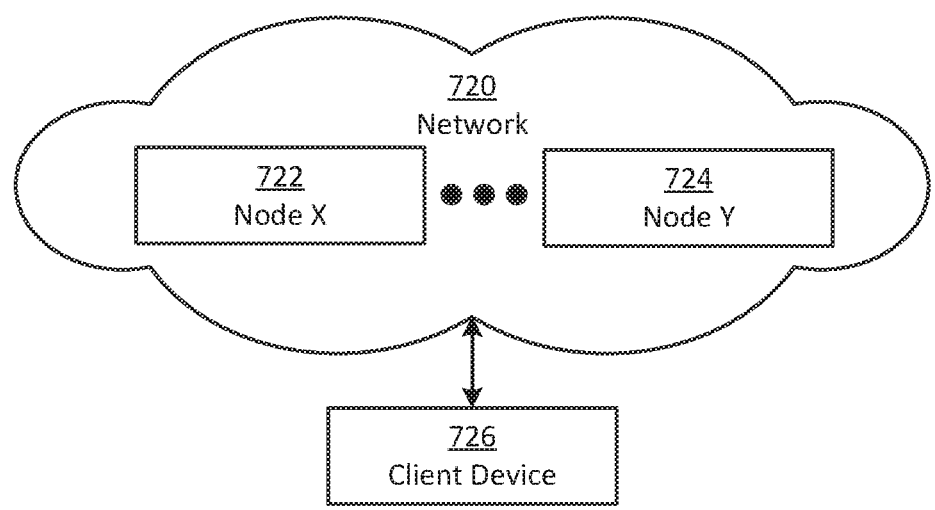

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for programming a network element, comprising:
   receiving an accounting policy configuration (APC) specifying a first network prefix and a second network prefix; and
   in response to the receiving, and based on, the APC:
      storing, in a forwarding equivalence class (FEC) table on the network element, a first FEC entry comprising a first FEC index and bridging next hop information (BNHI);
      storing, in a forwarding information base (FIB) on the network element, a first FIB entry comprising the first network prefix and the first FEC index;
      storing, in the FEC table, a second FEC entry comprising a second FEC index and the BNHI; and
      storing, in the FIB, a second FIB entry comprising the second network prefix and the second FEC index.

2. The method of claim 1, wherein the first network prefix is associated with a first one selected from a group consisting of network destination and a sub-destination, wherein the second network prefix is associated with a second one selected from a group consisting of a network destination and a sub-destination.

3. The method of claim 1, wherein the BNHI is associated with a next hop directly connected to the network element, wherein the BNHI comprises a media access control (MAC) address associated with the next hop and an identifier for an egress network interface on the network element.

4. The method of claim 1, further comprising:
   receiving a network packet from one selected from a group consisting of another network element and a source device;
   processing the network packet to obtain a destination Internet Protocol (IP) address;
   identifying the first FIB entry in the FIB, wherein the first network prefix in the first FIB entry is a longest prefix match (LPM) for the destination IP address;
   obtaining, based on the identifying, the first FEC index from the first FIB entry;
   identifying the first FEC entry in the FEC table using the first FEC index;
   obtaining, based on the identifying, the BNHI from the first FEC entry; and
   transmitting, based on the BNHI, the network packet towards a destination associated with the destination IP address.

5. The method of claim 4, further comprising:
   incrementing, in response to the transmitting, a counter mapped to the first FEC entry.

6. The method of claim 5, further comprising:
   generating a statistic based on a counter value associated with the counter; and
   providing, based on the APC, the statistic to a network administrator of the network element.

7. A network element, comprising:
   a network processor;
   a memory;
   a persistent storage device;
   a data plane comprising, a plurality of network interfaces, a forwarding information base (FIB) and a forwarding equivalence class (FEC) table; and
   a control plane comprising an accounting policy service (APS) agent operatively connected to the FIB and the FEC table, and configured to:
      receive an accounting policy configuration (APC) specifying a first network prefix and a second network prefix; and
      in response to the receiving, and based on, the APC:
         store, in the FEC table on the network element, a first FEC entry comprising a first FEC index and bridging next hop information (BNHI);
         store, in the FIB on the network element, a first FIB entry comprising the first network prefix and the first FEC index;
         store, in the FEC table, a second FEC entry comprising a second FEC index and the BNHI; and
         store, in the FIB, a second FIB entry comprising the second network prefix and the second FEC index.

8. The network element of claim 7, wherein the network processor operatively is connected to the plurality of network interfaces, the FIB, and the FEC table, and wherein the network processor is configured to:
   receive, at a first network interface of the plurality of network interfaces, a network packet from one selected from a group consisting of another network element and a source device;
   process the network packet to obtain a destination Internet Protocol (IP) address;
   identify the first FIB entry in the FIB, wherein the first network prefix in the first FIB entry is a longest prefix match (LPM) for the destination IP address;
   obtain, based on the identifying, the first FEC index from the first FIB entry;
   identify the first FEC entry in the FEC table using the first FEC index;
   obtain, based on the identifying, the BNHI from the first FEC entry; and
   transmit, based on the BNHI and from a second network interface of the plurality of network interfaces, the network packet towards a destination associated with the destination IP address.

9. The network element of claim 8, wherein the BNHI is associated with a next hop directly connected to the egress network interface, wherein the BNHI comprises a media access control (MAC) address associated with the next hop and an identifier for the egress network interface.

10. The network element of claim 8, wherein the network processor is further configured to: increment, in response to the transmitting, a counter mapped to the first FEC entry.

11. The network element of claim 10, wherein the APS agent is further configured to:
   generate a statistic based on a counter value associated with the counter; and
   provide, based on the APC, the statistic to an APS engine executing on the network element.

12. The network element of claim 8, further comprising:
   a management plane comprising an APS engine operatively connected to the APS agent, and configured to:
      obtain the APC from an administrator device operatively connected to a third network interface of the plurality of network interfaces; and
      provide the APC to the APS agent.

13. The network element of claim 12, wherein the APS engine is further configured to:
   receive a statistic from the APS agent; and
   transmit, based on the APC and using the third network interface, the statistic to the administrator device.

14. The network element of claim 7, wherein the network element is one selected from a group consisting of a switch, a router, and a multilayer switch.

15. A non-transitory computer readable medium (CRM) comprising computer readable program code, which when executed by a computer processor, enables the computer processor to:

receive an accounting policy configuration (APC) specifying a first network prefix and a second network prefix; and in response to the receiving, and based on, the APC:

store, in a forwarding equivalence class (FEC) table on the network element, a first FEC entry comprising a first FEC index and bridging next hop information (BNHI);

store, in a forwarding information base (FIB) on the network element, a first FIB entry comprising the first network prefix and the first FEC index;

store, in the FEC table, a second FEC entry comprising a second FEC index and the BNHI; and store, in the FIB, a second FIB entry comprising the second network prefix and the second FEC index.

16. The non-transitory CRM of claim 15, wherein the first network prefix is associated with a first one selected from a group consisting of a network destination and a sub-destination, wherein the second network prefix is associated with a second one selected from a group consisting of a network destination and a sub-destination.

17. The non-transitory CRM of claim 15, wherein the BNHI is associated with a next hop directly connected to the network element, wherein the BNHI comprises a media access control (MAC) address associated with the next hop and an identifier for an egress network interface on the network element.

18. The non-transitory CRM of claim 15, further comprising additional computer readable program code, which when executed by the computer processor, enables the computer processor to:

receive a network packet from one selected from a group consisting of another network element and a source device;

process the network packet to obtain a destination Internet Protocol (IP) address;

identify the first FIB entry in the FIB, wherein the first network prefix in the first FIB entry is a longest prefix match (LPM) for the destination IP address;

obtain, based on the identifying, the first FEC index from the first FIB entry;

identify the first FEC entry in the FEC table using the first FEC index;

obtain, based on the identifying, the BNHI from the first FEC entry; and transmit, based on the BNHI, the network packet towards a destination associated with the destination IP address.

19. The non-transitory CRM of claim 18, further comprising additional computer readable program code, which when executed by the computer processor, enables the computer processor to:

increment, in response to the transmitting, a counter mapped to the first FEC entry.

20. The non-transitory CRM of claim 19, further comprising additional computer readable program code, which when executed by the computer processor, enables the computer processor to:

generate a statistic based on a counter value associated with the counter; and provide, based on the APC, the statistic to a network administrator of the network element.

\* \* \* \* \*